United States Patent [19]

Karim et al.

[11] Patent Number: 4,798,428
[45] Date of Patent: Jan. 17, 1989

[54] FIBER OPTIC COUPLING SYSTEM

[75] Inventors: Mohammad Karim, Kettering, Ohio; Madhu C. Patel, Wichita, Kans.

[73] Assignee: NCR Corporation, Dayton, Ohio

[21] Appl. No.: 918,744

[22] Filed: Oct. 14, 1986

[51] Int. Cl.$^4$ ............................................. G02B 6/32
[52] U.S. Cl. ............................... 350/96.18; 350/96.21
[58] Field of Search ............... 350/96.18, 96.21, 96.22, 350/96.15

[56] References Cited

U.S. PATENT DOCUMENTS

| | | | |
|---|---|---|---|
| 3,508,807 | 4/1970 | Mayer | 350/96.18 |
| 4,082,421 | 4/1978 | Auracher et al. | 350/96.22 |
| 4,563,056 | 1/1986 | Ludman et al. | 350/96.18 |

*Primary Examiner*—John S. Heyman
*Attorney, Agent, or Firm*—Wilbert Hawk, Jr.; Edward Dugas; Floyd A. Gonzalez

[57] ABSTRACT

A system is disclosed for optically coupling together first and second fiber optic cables, having different or similar core diameters, to enable light to be transmitted from the first fiber optic cable to the second fiber optic cable with a minimum of light loss. In a preferred embodiment of the invention, the system comprises a housing, first and second connectors, and first and second biconvex lenses. The first connector terminates the first fiber optic cable and also connects to a first housing portion of the housing to enable a first fiber end of the first fiber optic cable to protrude into the first housing portion. The second connector terminates the second fiber optic cable and also connects to a second housing portion of the housing to enable a second fiber end of the second fiber optic cable to protrude into the second housing portion. The first and second biconvex lenses are respectively supported face-to-face in first and second housing segments located within the first and second housing portion of the housing. In operation, diverging light transmitted from the first fiber end is collected and substantially collimated by the first lens. The substantially collimated light from the first lens is converged by the second lens onto the second fiber end to complete the light path between the first and second fiber optic cables.

2 Claims, 3 Drawing Sheets

FIBER OPTIC COUPLING SYSTEM

BACKGROUND OF THE INVENTION

1. Field of the Invention

The present invention relates to fiber optic connectors and more particularly to a fiber optic coupling system for optically coupling together two fiber optic cables, which may or may not have different core diameters, to enable signal light to be transmitted between the two fiber optic cables with a minimum of signal light loss.

2. Description of the Prior Art

In long distance telecommunications systems and other signalling systems, more and more use is being made of fiber optic cables, or light guides, in the transmission of modulated light signals between distant locations due to the comparatively low attenuation inherent in fiber optic cables. However, in such long distance signalling systems utilizing fiber optic cables, connection obviously must be made from cable to cable and from cables to repeaters, light signal transmitters and other electro-optical devices.

Fiber optic connectors are therefore needed to produce such connections. However, it is necessary that a fiber optic connector properly align the abutting optical fibers in any two fiber optic cables to be optically coupled together. This is due to the fact that any lateral misalignment between abutting optical fibers of the cables to be optically coupled together can produce a significant attenuation of any light signals transmitted therebetween.

Various types of fiber optic connectors or couplers have been proposed to minimize the loss or attention of light signals when optically coupling two fiber optic cables or light guides together.

In a first type of fiber optic connector, the ends of two fiber optic cables are respectively mounted within two plugs (or connectors). The ends of the fiber optic cables come into direct contact with each other to couple the fiber optic cables together when the plugs are connected together. This first type of fiber optic connector requires a high degree of precision alignment in the centering of the two mating plugs with respect to each other to minimize light signal loss between the two fiber optic cables.

A second type of fiber optic connector, disclosed in U.S. Pat. No. 4,420,219, avoids the critical alignment problem involved in the above-discussed first optic connector by coupling first and second light guides to each other by way of a pair of lenses respectively mounted in a pair of mating plugs, which plugs house the first and second light guides. More specifically, in this second type of fiber optic connector a converging aspheric plano convex lens, having an aspherically shaped surface and a flat surface, is fastened in each of two plugs to be connected together. The flat surfaces of the lenses face outwardly so that they are in an abutting relationship with respect to each other when the plugs are connected together. The two light guides to be optically coupled together are also respectively fastened in the associated plugs, with the end surfaces of the light guides facing the associated aspherically shaped surfaces of the lenses and being substantially positioned at the respective focal points of the lenses. As a result, when the two plugs are connected together, light signals can be transmitted from the first light guide to the second light guide by way of the two abutting aspheric plano convex lenses.

Since the light guides are respectively fastened inside of the associated mating plugs and the end surfaces of the light guides are substantially positioned at the respective focal points of the associated lenses, this second type of fiber optic connector is limited in operation to only one particular size of light guide in each associated plug.

A third type of fiber optic connector, disclosed in U.S. Pat. No. 4,294,511, is basically a variation of the second type discussed above. In this third type of fiber optic connector a lens system is positioned between first and second light guides. This lens system, similar to that of U.S. Pat. No. 4,420,219, includes first and second lenses, each having a planor or flat surface and a convex surface. However, the flat surfaces of the lenses respectively face the ends of the first and second light guides, while the convex surfaces of the lenses face each other. The ends of the first and second light guides are substantially positioned at the focal points of the respective first and second lenses to enable light signals to be transmitted from the first light guide to the second light guide by way of the lens system.

The background art known to applicants at the time of the filing of this application is as follows:

U.S. Pat. No. 4,294,511, Connecting Optical System For Light Guides, by N. Yamashita et al.; and U.S. Pat. No. 4,420,219, Optical Waveguide Connector Using Aspheric Lenses, by F. Muchel.

None of the above-described different types of fiber optic connectors teaches or suggests a fiber optic coupling system which not only avoids the critical alignment problem involved in the abovediscussed first optic connector but also has the adaptability to optically couple together two fiber optic cables or light guides having either different or similar core diameters.

SUMMARY OF THE INVENTION

Briefly, a fiber optic coupling system is provided for optically coupling together two fiber optic cables (or light guides), which may or may not have different core diameters, to enable signal light to be transmitted from one fiber optic cable to the other with a minimum of signal light loss.

In accordance with an aspect of the invention, there is provided a fiber optic coupling system for coupling a first fiber end of a first fiber optic cable to a second fiber end of a second fiber optic cable, said optical coupling system comprising in combination: a housing having first and second end portions and first and second housing segments disposed between said first and second end portions; a first connector for terminating said first fiber optic cable and for connection to said first end portion to enable said first fiber end of said first fiber optic cable to protrude into said first end portion; a second connector for terminating said second fiber optic cable and for connection to said second end portion to enable said second fiber end of said second fiber optic cable to protrude into said second end portion; and first and second biconvex lenses respectively supported face-to-face in said first and second housing segments, said first lens substantially collimating diverging light transmitted from said first fiber end, said second lens substantially converging the substantially collimated light from said first lens onto said second fiber end to complete a light path between said first and second fiber optic cables. In accordance with another aspect of the invention the first and the second connector being adjustable on the first and the second end portions for fine tuning the position of the first end portion and the second end portion from the first and the second biconvex lenses, respectively.

BRIEF DESCRIPTION OF THE DRAWINGS

Various objects, features and advantages of the invention, as well as the invention itself, will become more apparent to those skilled in the art in the light of the following detailed description taken in consideration with the accompanying drawings wherein like reference numerals indicate like or corresponding parts throughout the several views and wherein.

DESCRIPTION OF THE PREFERRED EMBODIMENT

Figure 1:
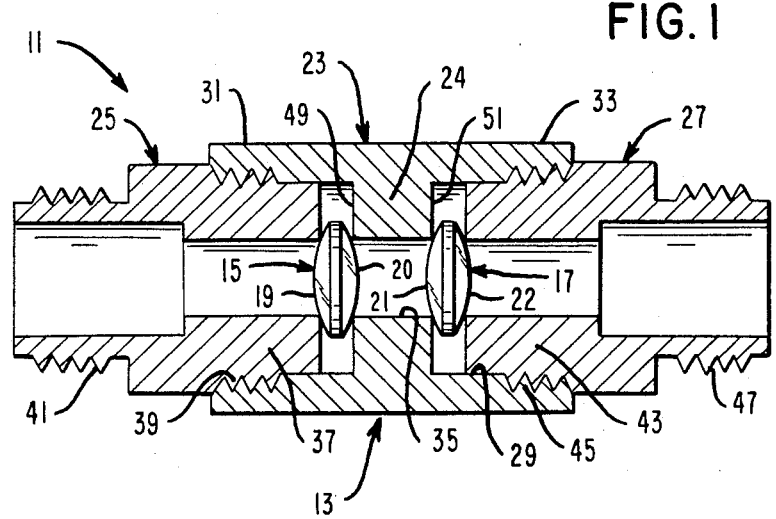
FIG. 1 is a sectional view of an optical lens coupler portion of the invention.

FIG. 1 shows an optical lens coupler 11 comprised of a housing or housing assembly 13 that holds two preselected biconvex lenses 15 and 17 positioned face-to-face with respect to each other. The lenses 15 and 17 are coated with an anti-reflection material on their faces 19, 20 and 21, 22, respectively. While the lenses 15 and 17 are shown separated from each other, it is within the purview of the invention that they could be positioned by the housing 13 so that the adjacent faces 20 and 21 of the lenses respectively, touch each other.

The housing 13 can be of any suitable type which secures the positions of the lenses 15 and 17 in a face-to-face relationship and which allows two connectorized fiber optic cables to be coupled thereto. One type of housing 13 is shown in FIG. 1.

As shown in FIG. 1, the housing 13 is comprised of a middle portion 23 and two end portions 25 and 27. The middle portion 23 comprises a hollow cylinder 29 having cylindrical, internally threaded extensions 31 and 33 at opposite ends of the cylinder 29 to form a circumferential interior shoulder 35 inside the middle portion 23. The end portion 25 comprises a hollow cylinder 37 having a threaded external surface 39 to engage with the internally threaded extension 31 of the middle portion 23 and an exteriorly threaded extension 41 to enable an associated connectorized fiber optic cable (FIG. 4) to be adjustably connected thereto. Similarly, the end portion 27 comprises a hollow cylinder 43 having a threaded external surface 45 to engage with the internally threaded extension 33 of the middle portion 23 and an exteriorly threaded extension 47 to enable an associated connectorized fiber optic cable (FIG. 4) to be adjustably connected thereto.

The lens 15 is vertically supported between the end portion 25 and a first side 49 of the shoulder 29 when there is threaded engagement between the extension 31 and the cylinder 37. In a similar manner, the lens 17 is vertically supported between the end portion 27 and a second side 51 of the shoulder 29 when there is threaded engagement between the extension 33 and cylinder 43. Thus, the end and middle portions 25 and 23 combine to form a first housing portion to support the lens 15, while the end and middle portions 27 and 23 combine to form a second housing portion to support the lens 17. The lenses 15 and 17 are so supported within the housing 13 that they are face-to-face with respect to each other, as stated before.

Figure 2:
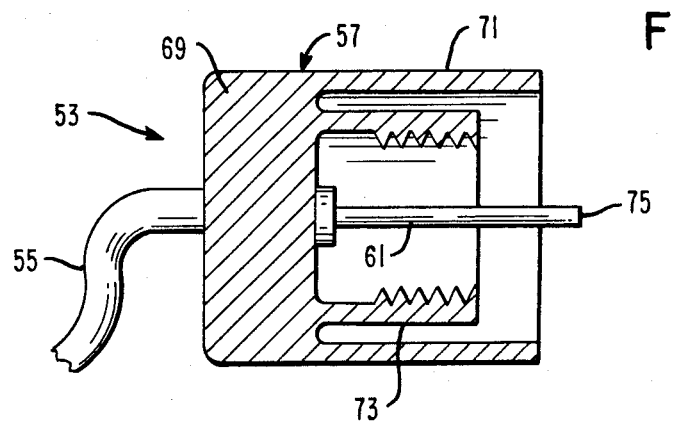
FIG. 2 is a sectional view of a connector portion of the invention, showing the connector coupled to a fiber optic cable.

FIG. 2 illustrates a typical connectorized fiber optic cable 53 which is comprised of a fiber optic cable and a connector 57.

Figure 3:
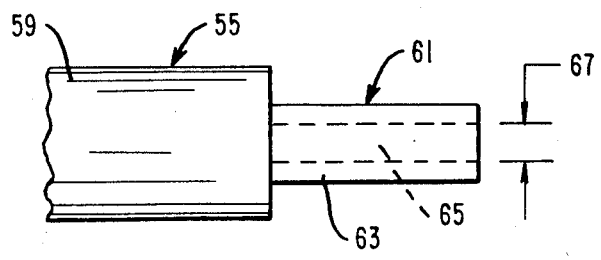
FIG. 3 is a partial sectional view of a typical fiber optic cable.

Referring briefly to FIG. 3, the fiber optic cable 55 has a protective jacket 59 and an optical fiber or fiber 61 which has an outer layer known as cladding 63 and an inner layer known as core 65. Conventionally, both the cladding and core are made of either glass or plastic, but with different indexes of refraction. The core 65 has a diameter designated by the reference numeral 67.

Referring back to FIG. 2, the connector 57 is comprised of a cylindrically shaped body 69 and outer and inner cylindrical extensions 71 and 73, respectively, from the body 69. Fiber optic cable 55 is selectively positioned within an accurately positioned hole (not shown) through the center of the body 69 and secured therein by means of, for example, an epoxy adhesive (not shown). The hole (not shown) and the cylindrical extensions 71 and 73 are concentric with respect to each other.

The assembly of the connector 57 and fiber optic cable 55 is such that the fiber 61 protrudes from the center of the connector 57 and is terminated just outside of the connector 57 with the end 75 of the fiber 61 exposed. The inner extension 73 of the connector 57 is internally threaded to enable the connector 57 to be connected to one of the end portions 25 and 27 of the optical lens coupler 11 of FIG. 1.

Figure 4:
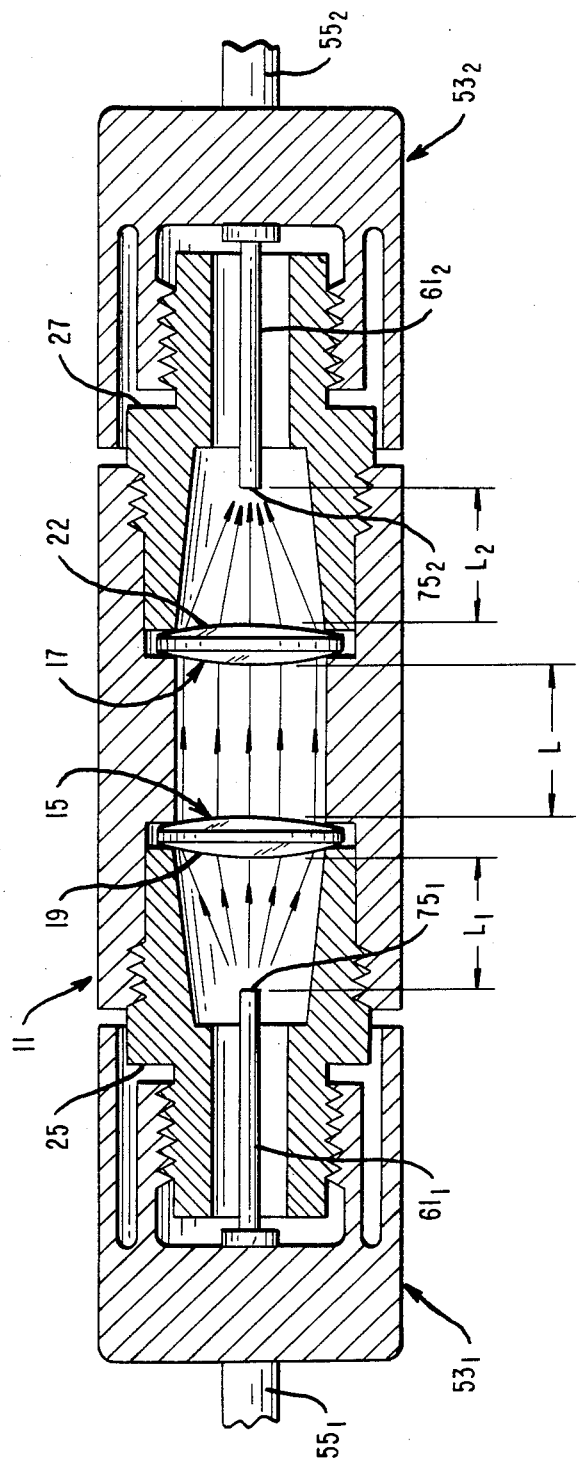
FIG. 4 is a sectional view of a fiber optic coupling system in accordance with a preferred embodiment of the invention.

FIG. 4 illustrates a sectional view of a fiber optic coupling system in accordance with the invention. As shown in FIG. 4, connectorized fiber optic cables $53_1$ and $53_2$, similar in construction to the connectorized fiber optic cable 53 of FIG. 2, are respectively connected to the end portions 25 and 27 of the optical lens coupler 11 of FIG. 1. When the connectorized fiber optic cables $53_1$ and $53_2$ are connected to the coupler 11, exposed fiber end $75_1$ of cable $53_1$ is within a certain critical distance $Lc_1$ (to be explained) from the surface 19 of the lens 15 and exposed fiber end $75_2$ of cable $53_2$ is within a certain critical distance $Lc_2$ (to be explained) from the surface 22 of the lens 17. These critical distances are achieved by screwing connectors 57 onto the two end portions 25 and 27 by amounts which correspond to the critical distances.

The function of the fiber optic coupling system of FIG. 4 is to transmit light signals coming out of fiber optic cable $55_1$ to fiber optic cable $55_2$ with a minimum of light signal losses. The light coming out of the core (not shown) at the fiber end $75_1$ of fiber optic cable $55_1$ diverges as it exits the end $75_1$. This diverging light is substantially collimated by the lens 15 for a short distance. The substantially collimated light from the lens 15 is converged by the lens 17 onto the core (not shown) at the fiber end and $75_2$ of fiber optic cable $55_2$. Lens 17 is located at a distance L from lens 15. When the lens 15 and 17 are touching, L=0.

As indicated before, in order to minimize light signal loss in the fiber optic coupling system of FIG. 4, the fiber end $75_1$ is located within a certain critical distance $L_{c1}$ from the surface 19 of the biconvex lens 15 while the fiber end $75_2$ is located within a certain critical distance $L_{c2}$ from the surface 22 of the biconvex lens 17. The distances at which the fiber ends $75_1$ and $75_2$ are respectively located from their associated lenses 15 and 17 are shown in FIG. 4 as $L_1$ and $L_2$, respectively. These locations of the fiber end $75_1$ and $75_2$ from their respective associated lenses 15 and 17, when coupled with the light gathering ability of the cores of the fibers $61_1$ and $61_2$, permit variation in dimensioning of mating parts of the system without additional light signal loss.

In order for the lens 15 to to receive as much transmitted light as possible from the fiber $61_1$, the light propagates from the core of the fiber $61_1$ in the form of a cone which must be confined within the surface 19 of the lens 45. The size of the cone from the core of the fiber $61_1$ is dependent upon the diameter of the core of the fiber $61_1$, the critical distance $LC_1$ and the material properties of the fiber $61_1$ (such as the index of refraction of each of the cladding and core of the fiber $61_1$ and the dispersion properties of the fiber $61_1$).

In order for the fiber $61_2$ to receive as much light as possible, the light from the lens 17 has to enter the core of the fiber $61_2$ in the form of a cone and at an angle which can confine the light within the core of the fiber $61_2$.

Figures 5, 6:
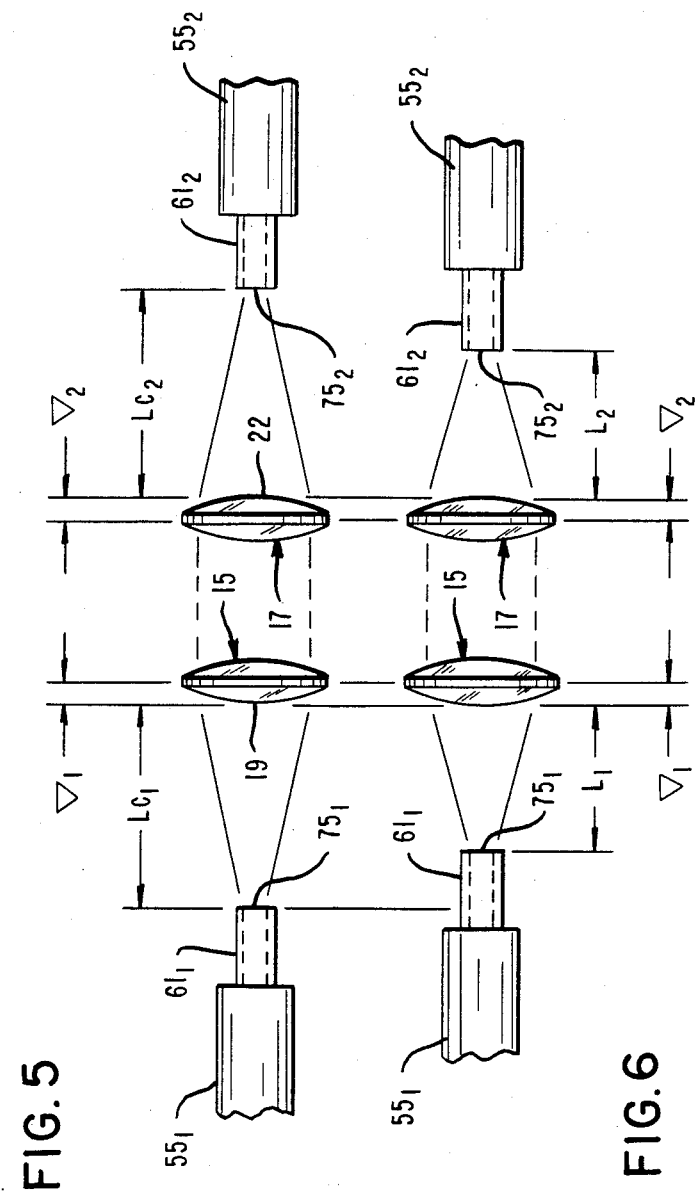
FIGS. 5 and 6 illustrate the critical distances and how they are utilized in the positioning of the ends of a fiber optic cables from their respective associated lenses.

FIG. 5 shows how the critical distances $L_{c1}$ and $L_{c2}$ are determined. The critical distance $L_{c1}$ is that distance between the end $75_1$ of the fiber $61_1$ and the biconvex lens 15 at which all of the rays of light emitted from the core of the fiber $61_1$ just barely cover the entire surface 19 of the lens 15. The critical distance $L_{c2}$ is that distance, between the end $75_2$ of the fiber $61_2$ and is equal to the focal length of the lens 17.

FIG. 6 shows how the critical distances $LC_1$ and $LC_2$ are utilized to respectively position the ends $75_1$ and $75_2$ at the respective distances $L_1$ and $L_2$ from the respective lenses 15 and 17. Depending on the diameter of the lens 15 and the size of the cone of light transmitted to the face 19 of the lens 15, the end $75_1$ should be located within the critical distance $LC_1$ from the lens 15 to confine the entire cone of light within the surface 19, in order to have a total transmission of light from the end $75_1$ to the lens 15. The distance $L_1$ from the lens 15 to the end $75_1$ is shown in FIG. 6. Note that this selected distance is less than the critical distance $L_{c1}$.

On the other hand, the end $75_2$ should be located within the focal length of the lens 17 to enable the lens 17 to converge all of the light therefrom onto the core of the fiber $61_2$. In this case, the distance $L_2$ from the lens 17 to the end $75_2$ is shown in FIG. 6. Note that this selected distance $L_2$ is less than the critical distance $L_{c2}$. Thus, it can be readily seen that the length of the fiber end $75_1$ protruding from the connector $53_1$ (FIG. 4), or the length of the fiber end $75_2$ protruding from the connector $53_2$ (FIG. 4), does not have to be cut very precisely in order to transmit light from the fiber optic cable $55_1$ to the fiber optic cable $55_2$. Also, core diameters of fiber optic cables can be of different sizes, provided that characteristics of lenses and fibers hold the relationships shown below in equations (1) and (2). Thus, the fiber optic coupling system of the invention can connect a fiber optic cable having a 62.5 micrometer diameter core to a fiber optic cable having an 85 micrometer diameter core.

$$L_{c1} = R_c / (\tan(\sin^{-1}(NA))) \text{ to } f - \nabla_1, \text{ and (1)}$$

$$L_{c2} = 0 \text{ to } f_2 - \nabla_2, \text{ (2)}$$

where:
$L_{c1}$ = critical distance between end $75_1$ and lens 15,
$R_c$ = radius of core of fiber $61_1$,
$NA$ = numerical aperture of end $75_1$,
$f$ = focal length of lens 15,
$\nabla_1$ = one half the thickness of lens 15,
$L_{c2}$ = critical distance between end $75_2$ and lens 17,
$f_2$ = focal length of lens 17, and
$\nabla_2$ = one half the thickness of lens 17.

It should be noted at this time that an important feature of the invention is that the connectors (such as 53 in FIG. 2) can all be the same size even though the sizes of the core diameters may be different or, in another application, the connectors can be of sizes determined by the respective core diameters. When the connectors are all of the same size, the sizes of the core diameters can be marked on the associated connectors and on the two end portions 25 and 27 for ease of identification and matching of the connectors and the two end portions 25 and 27. When the connectors are of sizes determined by the respective core diameters, the sizes of the connectors and end portions 25 and 27 can still be accordingly marked for ease of identification and matching, even though any given size of connector will only accept a fiber optic cable having a particular size of core diameter and that connector will only connect to an end portion which is adapted for use with a fiber optic cable having a particular core diameter.

Thus, any two connectorized fiber optic cables can readily be optically coupled together by selecting the appropriately sized optical lens coupler 11 from a plurality of different sizes of couplers 11 or a plurality of differently marked couplers 11.

While the salient features of the invention have been illustrated and described in a preferred embodiment of the invention, it should be readily apparent to those skilled in the art that many changes and modifications can be made in that preferred embodiment of the invention without departing from the spirit and true scope of the invention. Accordingly, the present invention should be considered as encompassing all such changes and modifications of the invention that fall within the broad scope of the invention as defined by the appended claims.

We claim:

1. A fiber optic coupling system for optically coupling a first fiber end of a first fiber optic cable, having a first core surrounded by a first cladding, to a second fiber end of a second fiber optic cable, having a second core substantially equal in diameter to the first core surrounded by a second cladding, said optical coupling system comprising:

a housing having first and second housing portions and first and second housing segments respectively disposed within said first and second housing portions;

a first connector for terminating said first fiber optic cable and adjustably connected to said first housing portion to enable said first fiber end of said first fiber optic cable to protrude into said first housing portion;

a second connector for terminating said second fiber optic cable and adjustably connected to said second housing portion to enable said second fiber end of said second fiber optic cable to protrude into said second housing portion, a first biconvex lens having a first diameter and a second biconvex lens having a second diameter respectively supported face-to-face in said first and second housing segments;

said first fiber end is located within a first distance from said first lens, said first distance being determined as a function of the diameters of said core of said first fiber optic cable and said first lens;

said second fiber end is located within a second distance from said second lens to enable said second lens to converge all of the light passing through said second lens onto said second fiber end; and said first lens substantially collimating diverging light transmitted from said first fiber end, said second lens substantially converging the substantially collimated light from said first lens onto said second fiber end to complete a light path between said first and second fiber optic cables.

2. The fiber optic coupling system of claim 1 wherein:
said first distance is determined by the equation:

$$Lc_2 = Rc/(\tan(\sin^{-1}(NA))) \text{ to } f - A_1,$$

and said second distance is determined by the equation:

$$Lc_2 = 0 \text{ to } f_2 - A_2,$$

where:
$Lc_1$ = said first distance,
$Rc$ = the radius of said core of said first fiber end,
$NA$ = the numerical aperture of said first fiber end,
$f_1$ = the focal length of said first lens,
$A_1$ = one half the thickness of said first lens,
$Lc_2$ = said second distance,
$f_2$ = the focal length of said second lens, and
$A_2$ = one half the thickness of said second lens.

* * * * *

UNITED STATES PATENT AND TRADEMARK OFFICE
CERTIFICATE OF CORRECTION

PATENT NO. : 4,798,428

DATED : January 17, 1989

INVENTOR(S) : Mohammad A. Karim et al.

It is certified that error appears in the above-identified patent and that said Letters Patent is hereby corrected as shown below:

Column 8, line 3, delete "$Lc_2$", and substitute --$Lc_1$--.

Signed and Sealed this

Eighteenth Day of July, 1989

Attest:

DONALD J. QUIGG

Attesting Officer

Commissioner of Patents and Trademarks